United States Patent
Giordano et al.

(10) Patent No.: US 8,249,985 B2
(45) Date of Patent: Aug. 21, 2012

(54) SUB-ACCOUNT MECHANISM

(75) Inventors: Joseph A. Giordano, Waxhaw, NC (US); Christopher R. Griggs, Hickory, NC (US); Hitesh Bajaj, Charlotte, NC (US); Douglas G. Brown, Waxhaw, NC (US); Jade M. Vo-Dinh, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 709 days.

(21) Appl. No.: 12/038,177

(22) Filed: Feb. 27, 2008

(65) Prior Publication Data

US 2009/0144193 A1 Jun. 4, 2009

Related U.S. Application Data

(60) Provisional application No. 60/991,172, filed on Nov. 29, 2007.

(51) Int. Cl.
*G06Q 40/00* (2006.01)
(52) U.S. Cl. .......................................... 705/39; 705/40
(58) Field of Classification Search ................ 705/39
See application file for complete search history.

(56) References Cited

U.S. PATENT DOCUMENTS

| | | | |
|---|---|---|---|
| 2004/0078321 A1* | 4/2004 | Lawrence | 705/38 |
| 2005/0267827 A1* | 12/2005 | Grant et al. | 705/35 |
| 2005/0288941 A1* | 12/2005 | DuBois et al. | 705/1 |

OTHER PUBLICATIONS

EPO: "Mitteilung des Europäischen Patentamts vom 1. Oktober 2007 über Geschäftsmethoden=Notice from the European Patent Office dated Oct. 1, 2007 concerning business methods = Comminqué de l'Office européen des brevets, en date du 1er octobre 2007, concernant les methods dans le domaine des activités" Journal Officiel De L'Office Europeen Des Brevets. Official Journal of the European Patent Office. Amtsblattt Des Europaeischen Patentamts, OEB, Munchen, DE, vol. 30, No. 11, Nov. 1, 2007.

* cited by examiner

*Primary Examiner* — Jason B Dunham
*Assistant Examiner* — Benjamin S Fields
(74) *Attorney, Agent, or Firm* — Michael A. Springs; Moore and Van Allen, PLLC; Ryan P. Harris (57) ABSTRACT

A system and method for controlling a monetary account with one or more sub-accounts is described. A monetary account with an entity is established and an account user associated with the monetary account is identified. A sub-account with the entity is established, where the sub-account is associated with the monetary account and includes monetary funds transferred from the monetary account. At least one sub-account user associated with the sub-account is identified, where the at least one sub-account user is different from the account user. One or more controls, placed by the account user, are established on at least one of the sub-account and the at least one sub-account user. The at least one sub-account user is restricted from accessing monetary funds in the monetary account and the account user is permitted to access the sub-account.

16 Claims, 10 Drawing Sheets

SUB-ACCOUNT MECHANISM

BACKGROUND

Today, individuals, such as parents, do not have an easy and seamless process to manage and dispense money to their dependents. Besides managing and controlling their dependents spending activities, safety in dependents carrying large amounts of cash may be a concern for parents.

Dependents are increasingly purchasing goods and services on-line where they cannot use cash but need a payment card. Since they may not have their own direct deposit account (DDA) or credit card account, they cannot use traditional methods of payment for this channel to purchase goods. At the physical point of service (POS), dependents generally use cash to make their purchases, which excludes financial entities from the payment transactions and associated revenues. In addition, merchants that sell digital media, e.g., music, movies, videos, etc., do not have a low cost micropayment solution.

Today, individuals and dependents may attain prepaid cards to use towards on-line purchases or physical retailers. Another alternative is using a parent's credit card where there are no controls on dependents spending activities. For physical retailers, the majority of purchases by dependents is made using cash or "additional" credit cards. Credit cards issued by competitors and cash as payment instruments remove financial entities from payments revenue.

ECommerce merchants whose business requires micropayments are currently dependent on credit/debit card transactions for payment. These companies are looking for processes that reduce their payment expense.

In addition, individuals may want to budget their resources across different financial needs. For example, a family may decide that a monthly income of $2000 may need to be budgeted for known and other expenses. The family may decide to restrict use of the monthly income to only $100 for gas, $100 a month for clothing items, $100 a month for entertainment items/services, and $200 a month for food items/services. In such a case, the family must maintain detailed records of who is spending what, where, when, and under what category.

A financial entity currently allows its customers to make payments to other financial entity customers through its online banking service. In order to make a payment, the sender has to ask receiver to provide their bank account number and zip code. The receiver needs to share this confidential account information in order to be able to get a payment. In addition, both the sender and receiver need to be customers of the financial entity. It is not possible for financial entity customers to send payments to anyone outside the financial entity or make payments to merchants directly from their bank accounts.

Person to person and person to merchant payments are not unique. There are number of companies that allow their customers to make payments using a stored value card or a pooled account. The stored value card or a pooled account is like a prepaid or a gift card and it exists separately from customer's bank accounts. The customer has to move money into this account through automated clearing house (ACH) transfer or credit card cash advance before these can be used to make payments. It typically takes 2-3 business days to move money into such accounts.

There are currently no practical and cost-effective systems that can provide a seamless integration of a master DDA, one or more sub-accounts, and merchant client accounts.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention are directed to a method and system for providing a seamless integration of a master DDA, one or more sub-accounts, and merchant client accounts. Aspects of the present disclosure are directed to establishment of a monetary account with an entity. An account user associated with the monetary account may be identified. A sub-account with the entity may be established, where the sub-account is associated with the monetary account and includes monetary funds transferred from the monetary account. At least one sub-account user associated with the sub-account may be identified, where the at least one sub-account user is different from the account user. One or more controls, placed by the account user, may be established on at least one of the sub-account and the at least one sub-account user. The at least one sub-account user may be restricted from accessing monetary funds in the monetary account and the account user is permitted to access the sub-account.

Another aspect of the present disclosure is directed to establishing a monetary account with an entity, the monetary account including monetary funds maintained within the entity. An account user associated with the monetary account may be identified, and a partner account, with the entity, a partner entity of the entity, the partner account including monetary funds maintained within the entity. A request from the account user to transfer monetary funds from the monetary account to the partner account through a website associated with the partner entity may be received. The monetary funds may be transferred from the monetary account to the partner account, where the monetary funds remain within the entity throughout the transfer.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
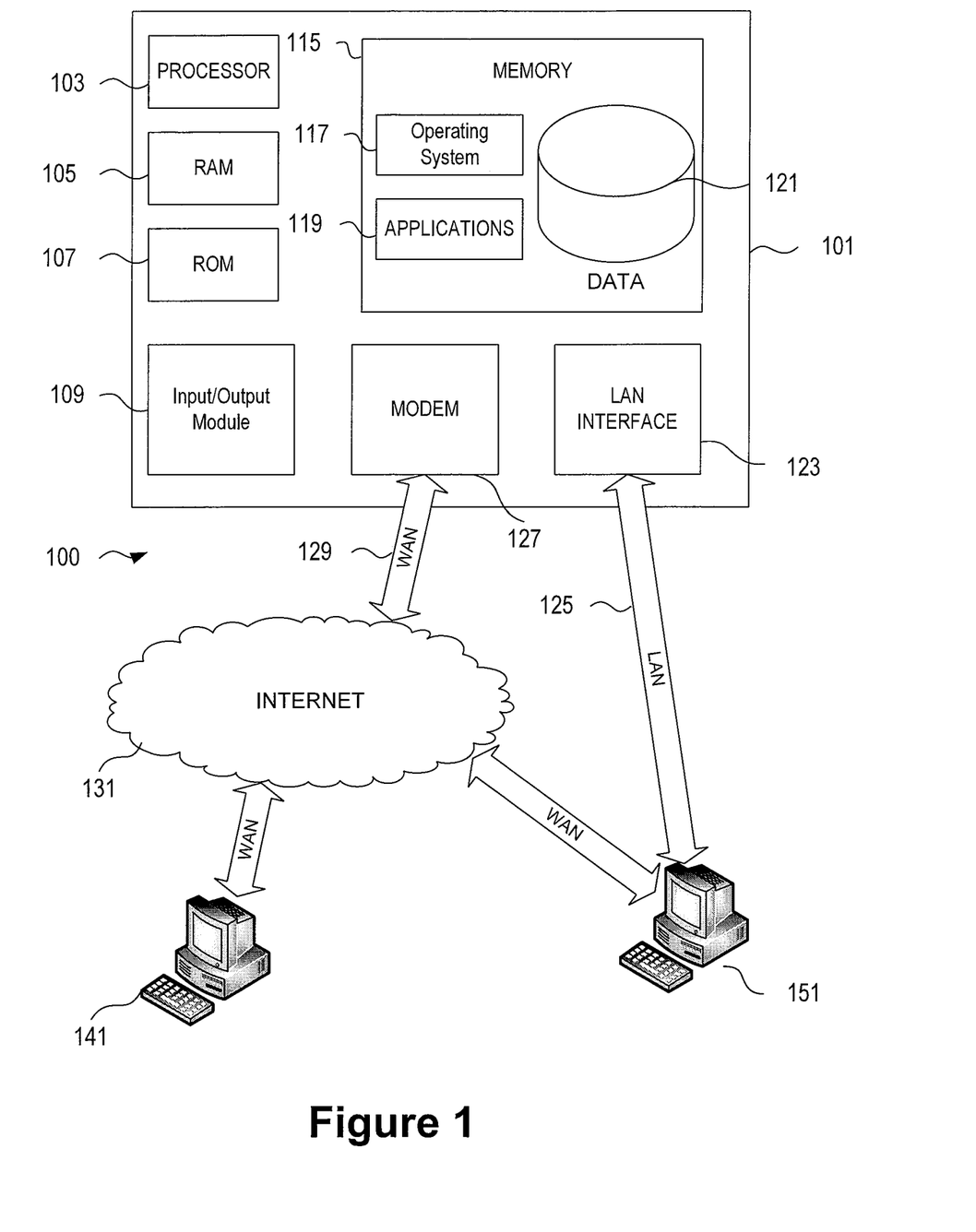
FIG. 1 illustrates a schematic diagram of a general-purpose digital computing environment in which certain aspects of the present invention may be implemented.

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
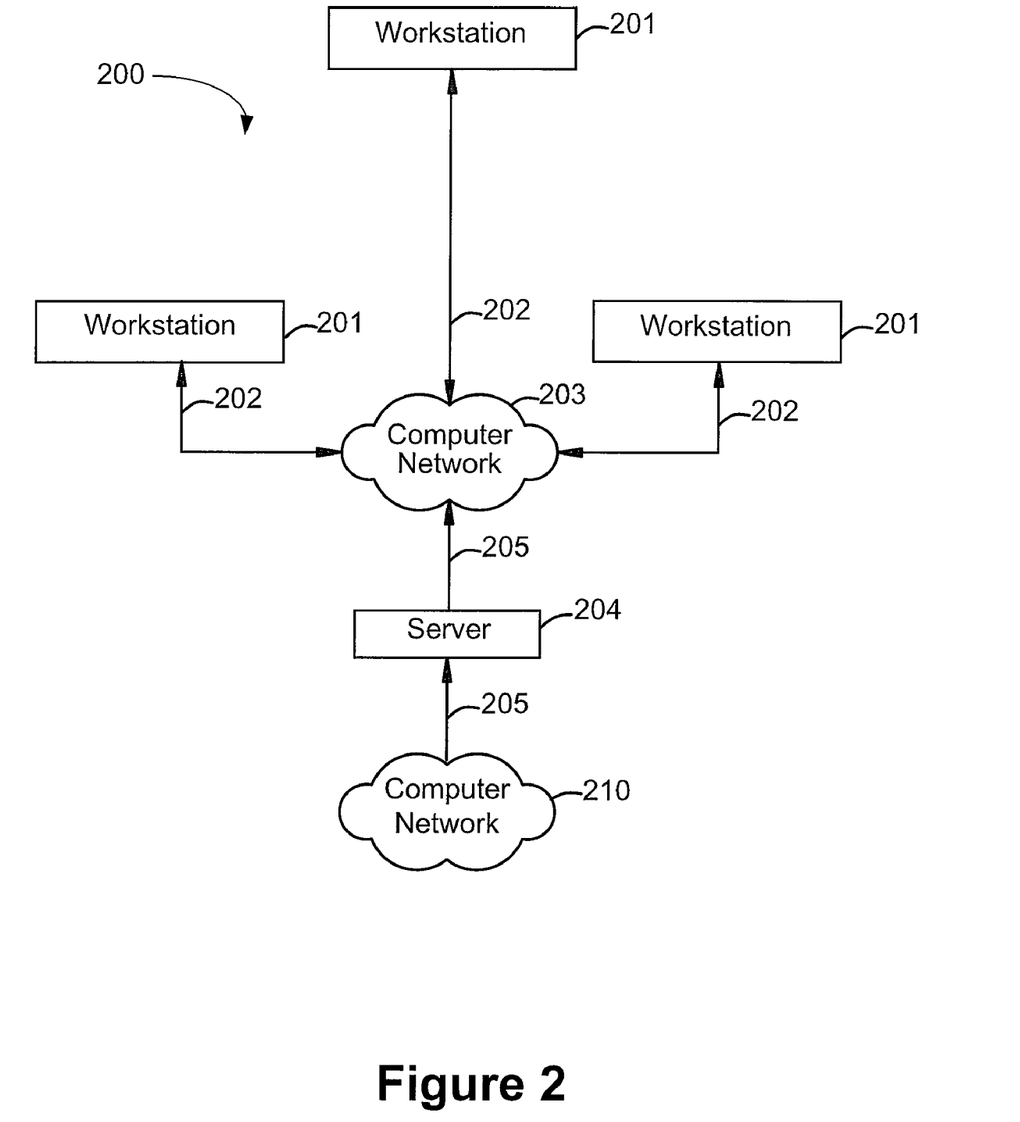
FIG. 2 is an illustrative block diagram of workstations and servers that may be used to implement the processes and functions of certain embodiments of the present invention.

Referring to FIG. 2, an illustrative system 200 for implementing methods according to the present invention is shown. As illustrated, system 200 may include one or more workstations 201. Workstations 201 may be local or remote, and are connected by one or communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

As understood by those skilled in the art, the steps that follow in the Figures may be implemented by one or more of the components in FIGS. 1 and 2 and/or other components, including other computing devices.

Aspects of the present disclosure allow a financial entity to capture more cash-to-card payment volume and provide partners to the financial entity a reduction in payment expense. A company has the ability to bring users to a financial entity and can partner with the financial entity to create an affinity relationship and product.

The integration of companion cards, whether debit or stored value, to sub-accounts and a master direct deposit account (DDA) is described. The companion cards do not have access to the master DDA, which allows the primary account holder to have complete control over spending activities of the sub-accounts. The primary account holder can transfer funds between the master DDA and sub-accounts through her preferred channel of banking, e.g., automated teller machine (ATM), online banking, mobile banking, etc. Until the money is spent using the companion cards, deposit balances remain in the sub-accounts, which keep the funds in the financial entity banking system. Also, the companion card enables a financial entity to capture new payment transactions where cash may have been used previously.

Additionally, when a customer of a financial entity makes a purchase on-line from a partner of the financial entity, the payment may be linked to the sub-accounts described above. The deposits may be moved from the consumer's sub-account to the affinity partner's corporate account real-time. This process is more cost efficient for the affinity partners since it optimizes transaction routing. Also, deposit balances remain in the financial entity banking system. This account to account transfer process is a faster and cheaper method of processing payments for affinity merchants.

Aspects of the present disclosure integrate the dependent payment instrument, e.g., companion card, to the sub-accounts of the master DDA without allowing access to the master DDA by users of the sub-accounts.

Traditional transactions using prepaid cards decreases balances, by removing money deposited in the bank, even before actual purchase transactions are made. This situation decreases the cash amount remaining in the bank, thus decreasing a source of revenues for banks. Additionally, using cash as a payment instrument also decreases balances, another source of bank revenues.

Aspects of the present disclosure address the above problems and create new revenue streams for a financial entity through an increase of point of service (POS) transactions by shifting payment instrument from cash to debit or stored value cards at the physical retailer. At the same time, this concept creates the incremental DDA balances by delaying the withdrawal of funds until there is spending activity. The system also provides an instantaneous control mechanism for the primary DDA holder to track and control spending activities made by dependents.

Furthermore, aspects of the present disclosure allow eCommerce partners in the micropayment business to have a more cost-effective process to settle their payment transactions through the system. For customers of a financial entity, the financial entity may optimize transaction routing for payment processing real-time. The consumer account of the financial entity may be debited much like a debit card transactions while the affinity partner's business client account may be credited. Thus, funds stay in the banking system of the financial entity.

The integration of companion cards to sub-accounts directly linked to a DDA is an aspect of the present disclosure.

In addition, optimizing transaction routing for eCommerce affinity partners is another aspect. For transactions between affinity merchants of a financial entity and customers of the financial entity, the financial entity may identify these payment transactions and process them in the lowest cost manner. The financial entity may use account to account transfer mechanism to move money from the customer to the merchant instead of the traditional payment processes using the credit/debit/ACH network (described below in FIG. 5). In one embodiment, the financial entity may determine pricing for the account to account transfer mechanism that will be cost effective for the merchant.

As should be understood by those skilled in the art, various combinations and subcombinations of the descriptions included herein may be utilized absent the illustrative example provided. For example, in accordance with one or more aspects of the present disclosure, there is no requirement in place to mandate a user to open a master account with a financial entity before a sub-account may be opened. A person using an account with a merchant that is linked to the financial entity is able to open a sub-account anytime without first having to apply for a master DDA with the financial entity. In such a situation, the sub-account is an account of the user in which the user does not have other accounts affiliated with the financial entity. As such, the merchant, such as a media downloading web site, may have a link to open such a sub-account with the financial entity. In addition, a person receiving payment who does not have a sub-account may open one to get access to those funds. A P2P/P2M account may be such an opened account. A P2P/P2M account described herein may exist on its own.

Figure 3:
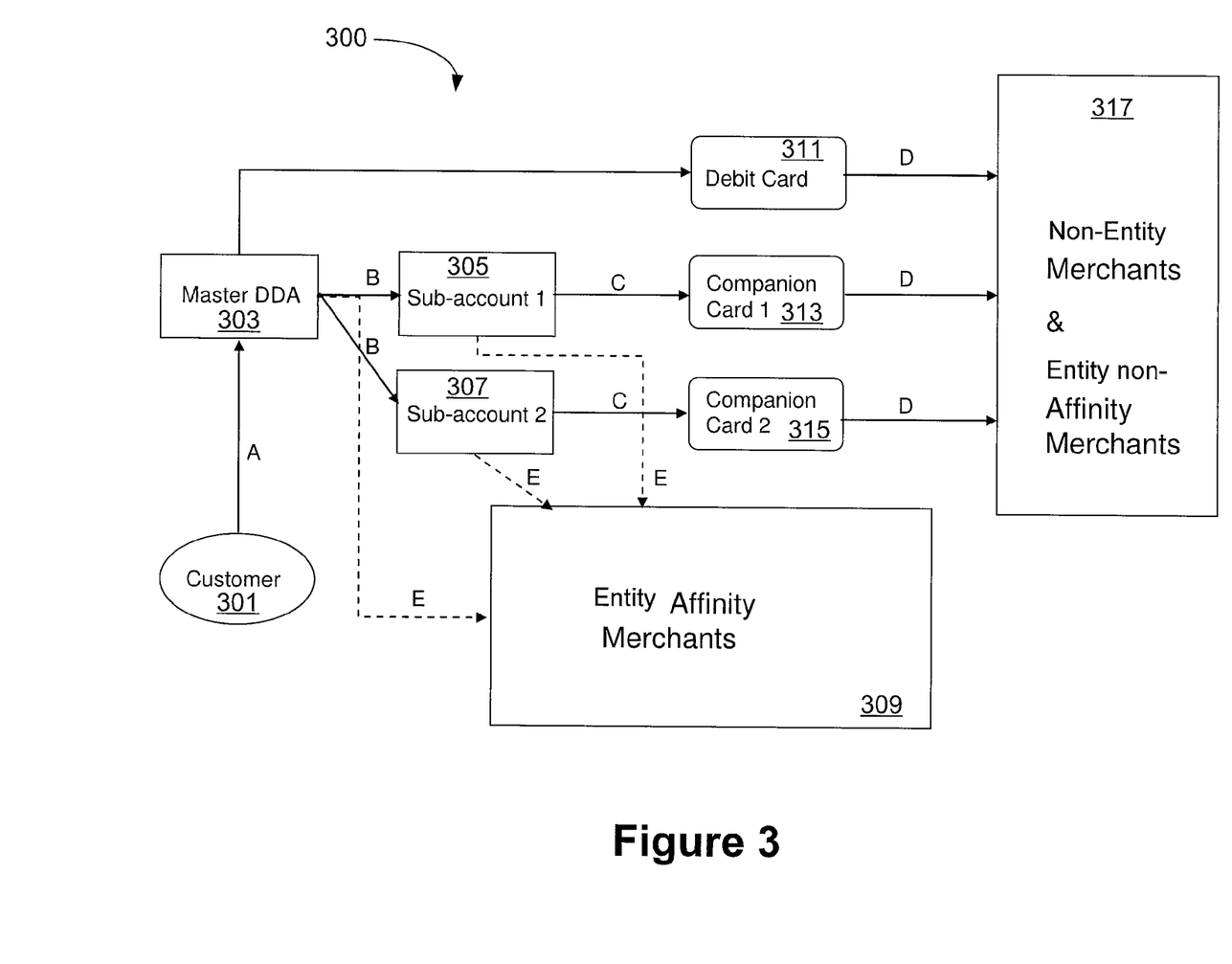
FIG. 3 is an example block diagram of an illustrative environment for applying a master account and associated sub-accounts in accordance with at least one aspect of the present invention.

FIG. 3 is an example block diagram of an illustrative environment 300 for applying a master account and associated sub-accounts in accordance with at least one aspect of the present invention.

A customer 301 has access to a master direct deposit account (DDA) 303 through any of a number of different channels of communication, including, but not limited to, online banking, mobile banking, and ATM, shown by A. Customer 301 may make money transfers between the master DDA 303 and one or more sub-accounts, such as sub-account 1 305 and sub-account 2 307 without any cost, shown by B.

One or more companion cards, such as companion card 1 313 and companion card 2 315, are linked to the sub-accounts, as shown by C, and cannot access deposits in the master DDA 303. This allows the customer/primary account holder to have control of the level of spending activities made by both the existing debit cards 311 and all companion cards 313 and 315.

Figure 5:
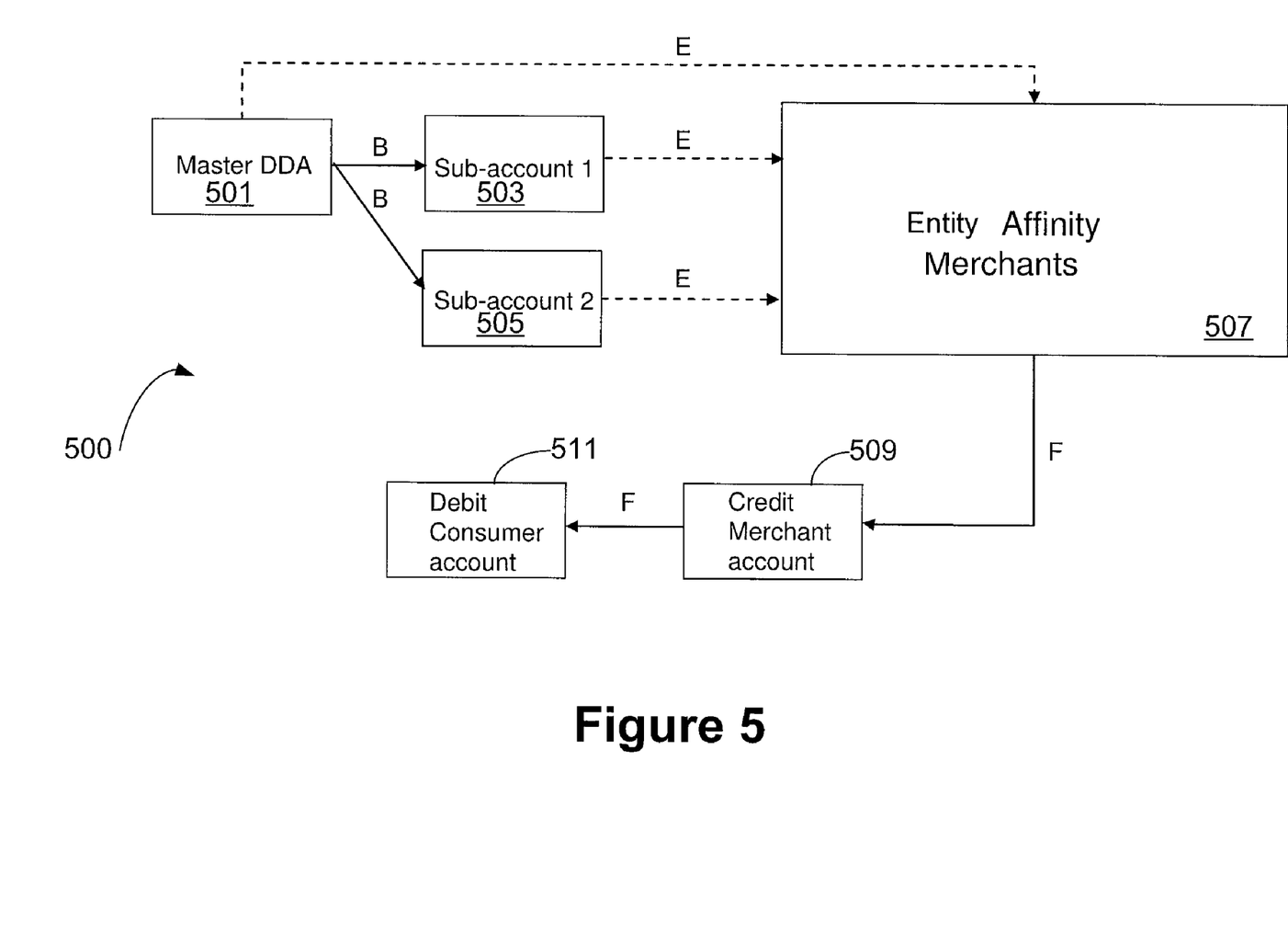
FIG. 5 is another example block diagram of an illustrative environment for applying a master account and associated sub-accounts in accordance with at least one aspect of the present invention.

Companion cards 313 and 315 may be used for eCommerce with non-entity merchants and entity non-affinity merchants 317, at a physical POS and at ATMs in the same manner that the primary cardholder debit card 311 is used, as shown by D. For eCommerce businesses that have an affinity partnership with the financial entity 309, payments between an entity consumer and merchant may be processed real-time and transaction routing may be optimized, as shown by E. FIG. 5 provides further details below.

Figure 4:
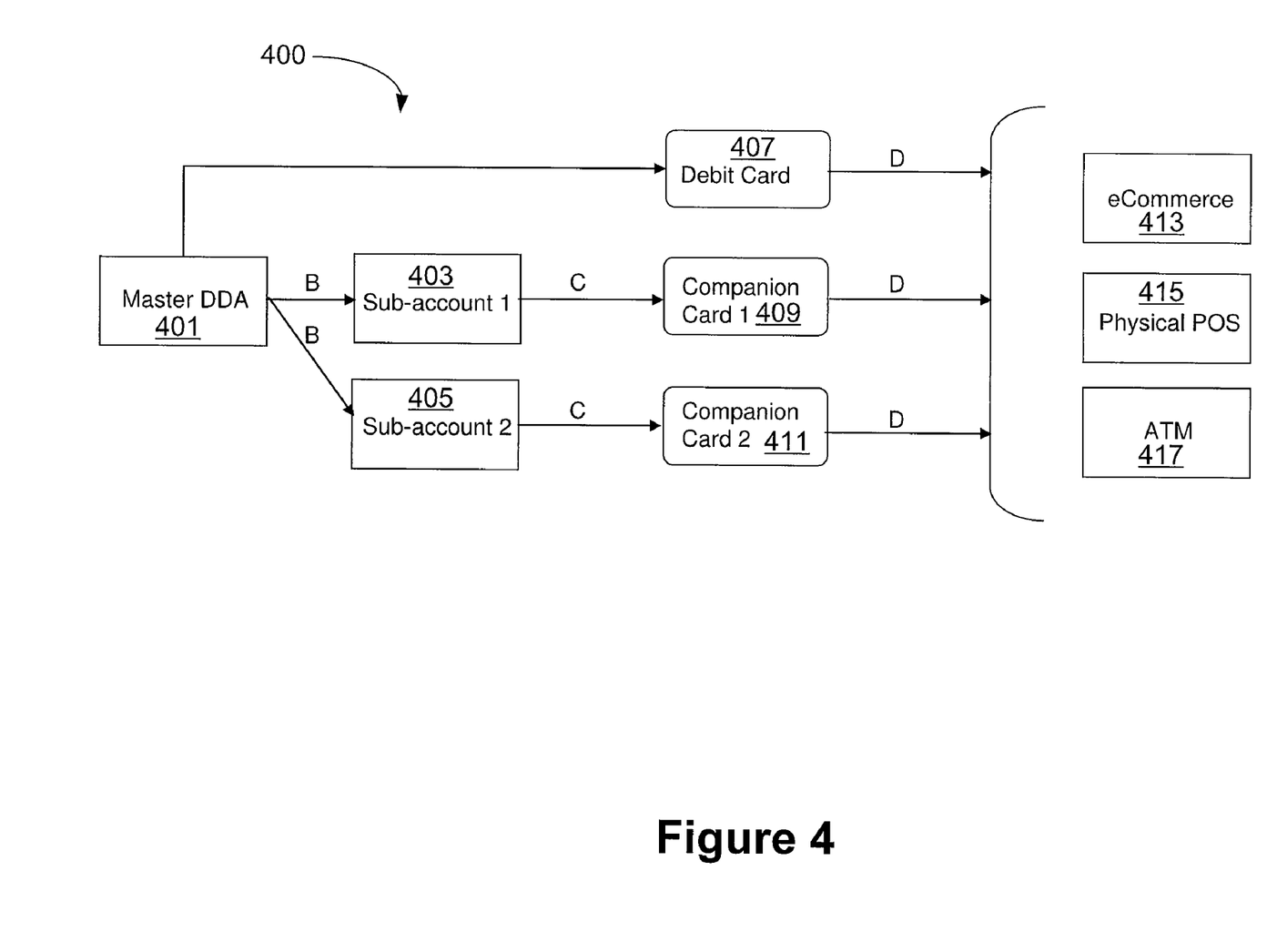
FIG. 4 is another example block diagram of an illustrative environment for applying a master account and associated sub-accounts in accordance with at least one aspect of the present invention.

FIG. 4 is another example block diagram of an illustrative environment 400 for applying a master account and associated sub-accounts for non-financial entity merchants and financial entity non-affinity merchants in accordance with at least one aspect of the present invention. A customer may make money transfers between a master DDA 401 and one or more sub-accounts, such as sub-account 1 403 and sub-account 2 405, without any cost, as shown by B.

One or more companion cards, such as companion card 1 409 and companion card 2 411, are linked to the sub-accounts 403 and 405, as shown by C, and cannot access deposits in the master DDA 401. This allows the customer/primary account holder to have control of the level of spending activities made by both the existing debit cards 407 and all companion cards 409 and 411. Companion cards 409 and 411 may be used for eCommerce 413, at a physical POS 415 and at ATMs 417 in the same manner that the primary cardholder debit card 407 is used, as shown by D. Transactions may be processed through a debit, credit, or ATM network.

FIG. 5 is another example block diagram of an illustrative environment 500 for applying a master account and associated sub-accounts for financial entity affinity merchant partners 507 in accordance with at least one aspect of the present invention. A customer may make money transfers between a master DDA 501 and one or more sub-accounts, such as sub-account 1 503 and sub-account 2 505, without any cost, as shown by B. For eCommerce businesses 507 that have an affinity partnership with the financial entity, payments between consumers and merchants of the financial entity are processed real-time and transaction routing is optimized, as shown by E. The real-time payment may initiate money transfer between the financial entity consumer account 501 or sub-account, such as 503 and 505, and the merchant 507 corporate account, where the merchant account is credited 509 and the consumer account is debited 511, as shown by F. A small processing payment may be charged to the merchant 507.

Figure 6:
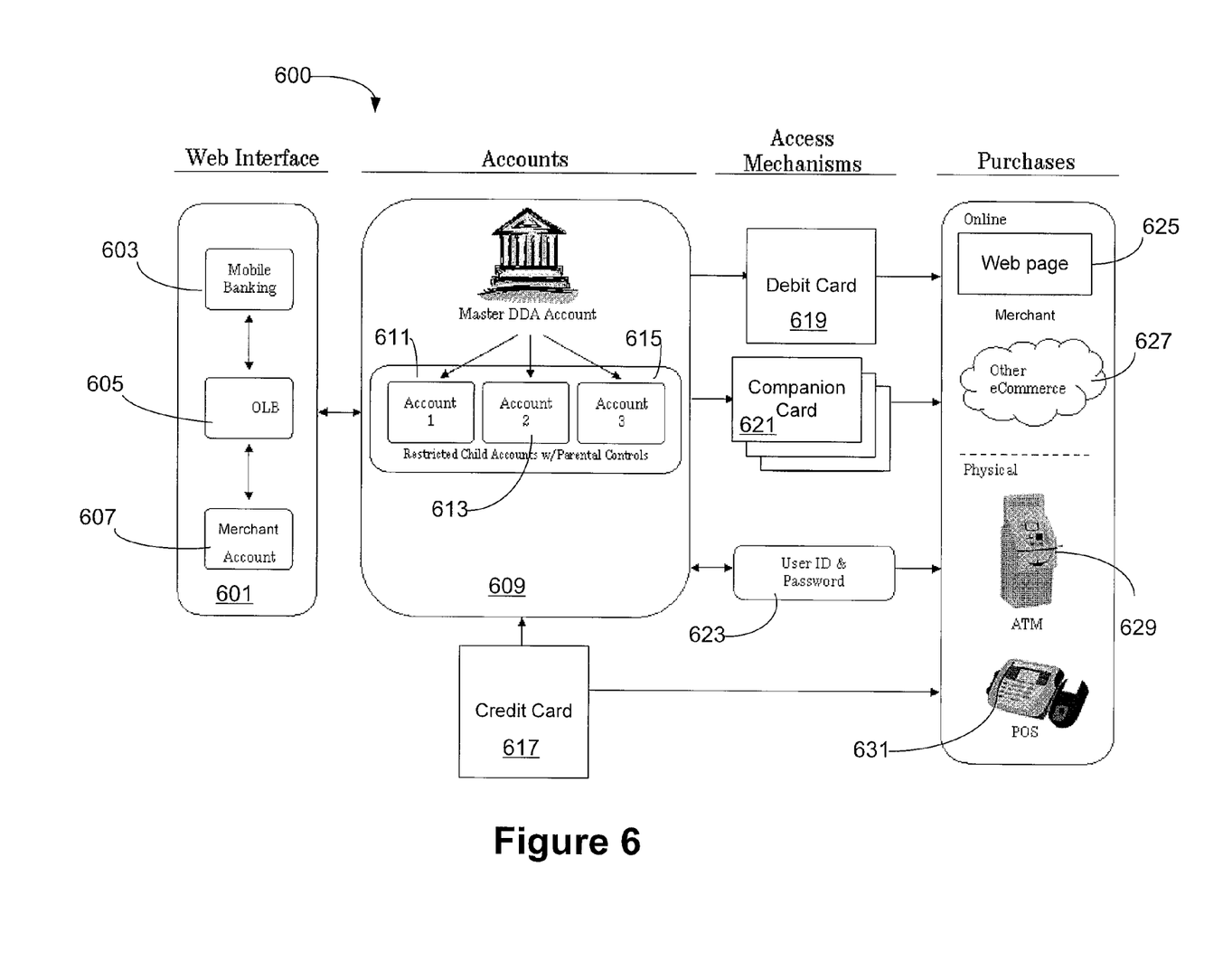
FIG. 6 is an example flowchart of an illustrative method for applying a master account and associated sub-accounts in accordance with at least one aspect of the present invention.

FIG. 6 is an example flowchart 600 of an illustrative method for applying a master account and associated sub-accounts in accordance with at least one aspect of the present invention. Various web interfaces 601 may be utilized in accordance with aspects of the present invention. Customers may work with and access master accounts and sub-accounts via mobile banking 603, online banking application 605, and/or merchant account 607. A customer may have a master account, such as master DDA 609, associated with a financial entity. The master account 609 may include a plurality of sub-accounts. As shown, master account 609 includes sub-account 1 611, sub-account 2 613, and sub-account 3 615. sub-accounts 611, 613, and 615 may be restricted child accounts with one or more parental controls in place.

As described herein, there may be any of a number of different controls on a sub-account and different controls may be placed on different accounts. Controls include the ability to transfer funds out of the sub-account, whether the amount, to the particular recipient, to a particular time period, etc. Controls also include the ability to receive funds into the sub-account, whether from particular individuals or entities, the amount, to a particular time period, etc. Controls further may include other functions associated with the account including ability to change access passwords or IDs, ability to allow others to access the sub-account, and ability to restrict others from accessing the sub-account.

The master account 609 and one or more of the sub-accounts 611, 613, and 615, may have access mechanisms in place, such as a debit card 619, one or more companion cards 621, and a user ID and password 623. The access mechanisms allow for purchases to web pages 625, other eCommerce 627, ATMs 629 and point of service device 631, such as telephone orders. With the controls in place, any of a number of different restrictions may be placed on a sub-account. For example, sub-account 611 may be for a sixteen year old minor while sub-account 613 may be for a twelve year old minor. A parent of the master account 609 may allow the sixteen year old to access certain web sites 625 or an ATM 629 while restricting the twelve year old from the same. With controls in place on the sub-accounts, the twelve year old associated with the sub-account 613 cannot access the restricted web sites 625 and/or ATMs 629. Any of a number of different controls schemes may be in place with respect to the sub-accounts. The examples included herein are merely illustrative and should not be limited to the same.

Figure 7:
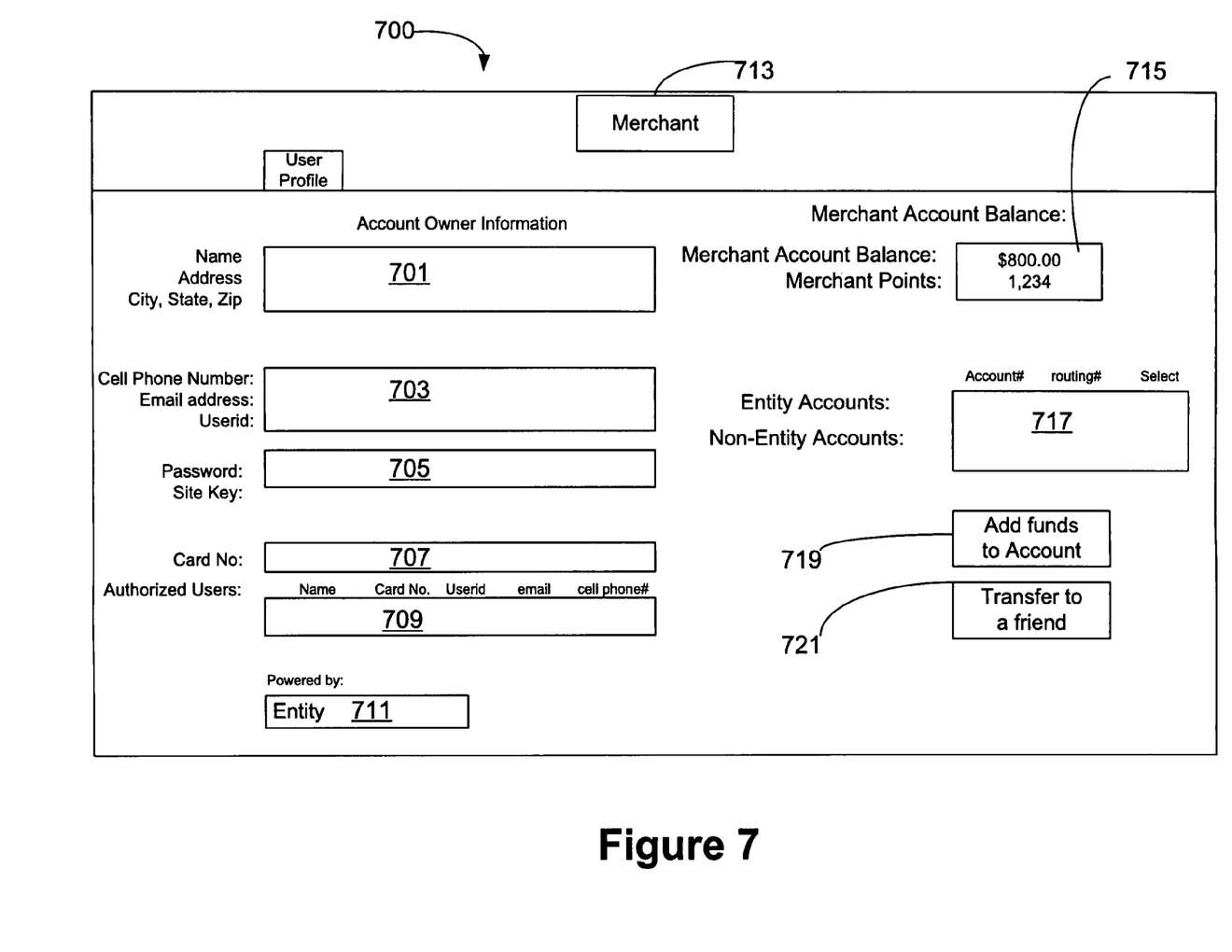
FIG. 7 is an illustrative user interface for maintaining a master account and sub-accounts with respect to a merchant in accordance with one or more aspects of the present invention.

FIG. 7 is an illustrative user interface 700 for maintaining a master account and sub-accounts with respect to a merchant in accordance with one or more aspects of the present invention. A user profile for a customer of a financial entity 711 is shown with respect to a particular merchant 713. As shown, various data fields are included to input data and to see current data. Data field 701 allows a user to enter account owner information, such as name, address, etc. Data field 703 allows the user to enter additional account owner data including user ID, cellular phone number, and email address. Data field 705 allows the user to enter a password or web site key.

Data field 707 includes card number data, such as an account number and an expiration date, for an account number associated with a master account of the user. Data field 709 includes a listing of individuals and corresponding information for one or more sub-accounts associated with that account. Data field 715 shows merchant account balance information. Data field 717 shows financial entity and non-financial entity account data for funding accounts. Input 719 allows a user to add funds to an account in which one or more other screens may be provided. Input 721 allows a user to transfer funds to a friend in which one or more other screens may be provided.

A parent may manage one or more children sub-accounts from the parent's master account. As part of the parent account, the parent can see all of her accounts associated with the master account in addition to the sub-accounts. The parent may transfer funds form one or more of her accounts in the master account to one or more of the children's sub-accounts through any of a number of different interfaces. An email may be sent to the child to inform them of the transfer. The child may access a web site, such as a music downloading website, to see the new net balance on his child sub-account. Alternatively, the child may see the balance by directly accessing the web site or online banking of the financial entity. If not restricted by control mechanisms described herein, the child may immediately purchase music from the music downloading website from funds in the child's sub-account. In another embodiment, the child may request funds through an interface associated with the financial entity and/or a particular merchant web site.

Further aspects of the present disclosure describe a payment product for online banking integrated person to person (P2P) and person to merchant (P2M) payments that allows customers of a financial entity to make payments directly from their bank accounts, whether checking, savings, line of credit, credit card and other accounts, to anyone, including non-financial entity customers, without having to share any confidential account information. The product may be used to make payments to consumers as well as merchants.

The person to person and person to merchant payment product allows customers to make payments to anyone, consumers and merchants, directly from their financial entity accounts. Currently no other entity offers such a product that allows payments directly from bank accounts. In addition, this process results in non-financial entity customers to open a new type of checking account, for P2P/P2M use, with the financial entity in order to receive their funds. Currently no other entity offers such a viral bank account opening process.

This product also lets the customers of the financial entity open a P2P/P2M account and use it for making payments or send money to minors who currently cannot open their own accounts, creating a separate P2P/P2M account that will have funds for the minor. The minor may only access this P2M/P2M account especially set up for them whereas the parents will have full access to the P2P/P2M account in addition to their own account(s) at the financial entity. Currently such an account, which parents can access along with their other regular accounts but where minors can only access the account set up for them, is also not offered.

Figure 8:
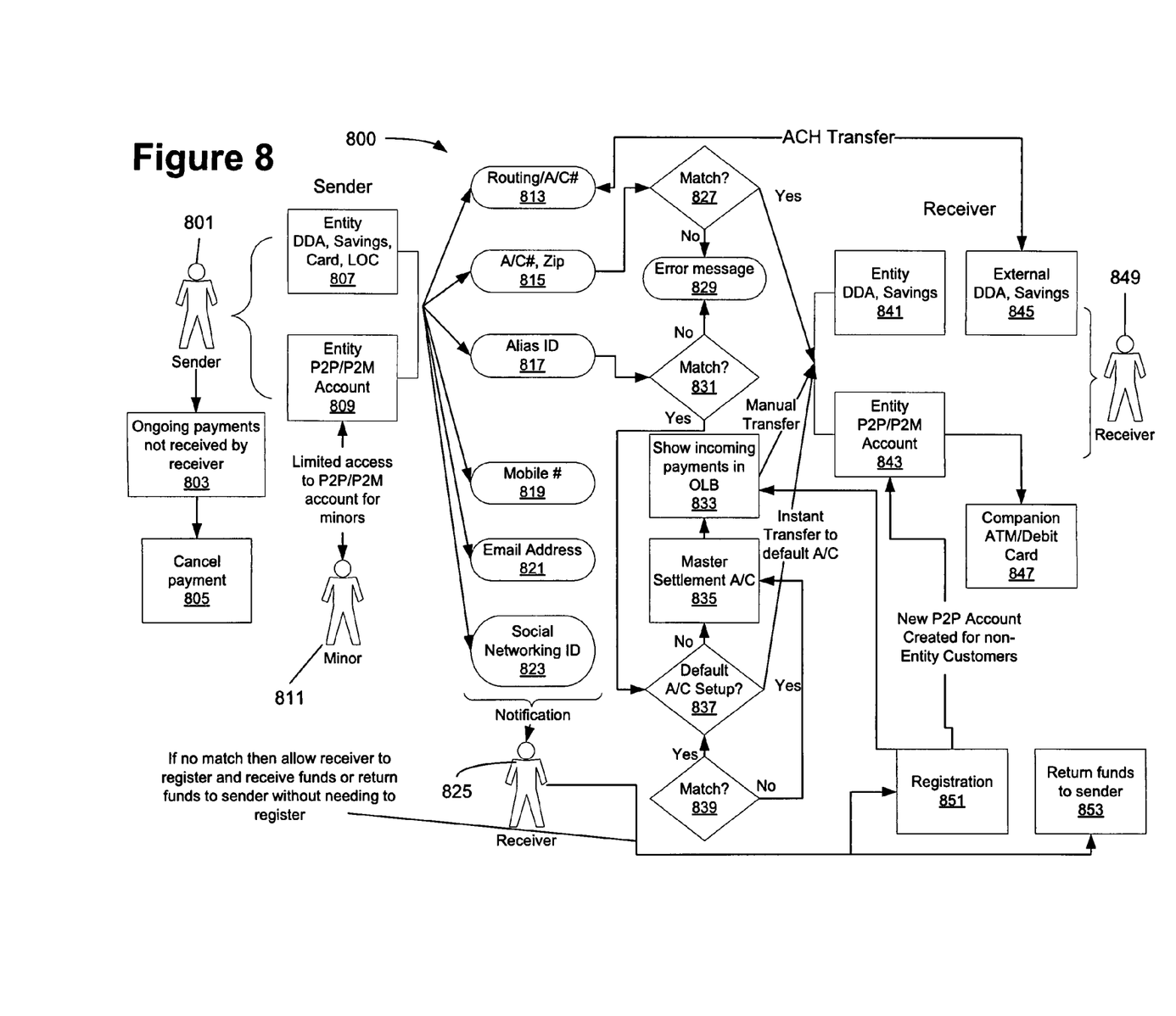
FIG. 8 is an example flowchart of a method for making person to person payments in accordance with one or more aspects of the present invention.

The product described below will allow its customers to make P2P payments to anyone. FIG. 8 is an example flowchart of a method 800 for making person to person payments in accordance with one or more aspects of the present invention. A customer 801 with an eligible account 807, e.g., checking (DDA), savings, line of credit, credit card, of a financial entity is be able to register and make use of this service. During the registration process, the customer 801 is able to set up an Alias ID 817 that maps back to their online banking ID and optionally also provide one or multiple additional unique identifiers, e.g., mobile number 819, email address 821, social networking ID 823. The information provided by the customer 801 may be verified to confirm that they do have access to the mobile number 819, email address 821, or social networking ID 823 provided. Once the information is verified, then it will be linked to their online banking ID, i.e., to all of their financial entity accounts. If outgoing payments are not received by a receiver in 803, payment may be canceled in 805.

Customer 801 also is able to set preferences for accounts to be used for outgoing payments, default account(s) for incoming payments, and alternatively also has an option of opening a new financial entity P2P/P2M account 809 that she may use for making payments. This financial entity P2P/P2M account 809 may be like any other account hosted at the financial entity and so money may be moved instantly into this account 809 through the regular online banking transfer process for moving money between accounts. This account 809 may be a type of checking account except that it may come with certain limitations, e.g. no checks, maximum balance limits, number of daily transactions, and may be opened by customers by providing much less information as compared to a regular checking account. The financial entity may, at a minimum, require customers to provide certain information, such as name, address, date of birth, and social security number, in order to comply with Anti-Money Laundering regulations.

Customers 801 of the financial entity also have an option to set up P2P/P2M accounts 809 for minors 825. Customers 801 are able to access these accounts just like any of their other accounts. In addition, customer 801 are able to set up an online banking access ID for the minor 825 that the minor 825 may use to sign into online banking but have access only to the specific minor P2P/P2M account 809 set up for them.

Customers 801 of the financial entity are able to make payments to other people through any of a number of different methods. Payments may be made by a routing number/account number 813. Payments may also be made by providing an account number or zip code 815. If there is a match to an existing financial entity account in 827, then the funds are transferred instantly to that account. Else, an error message 829 may be generated. Payments may be made by providing an Alias ID 817. If there is a match to an Alias ID of another customer in 831, then payment may be initiated to that person. Else, an error message 829 may be generated.

If the receiver has set up default account(s) for incoming payments in 837, then the funds may be transferred instantly to that account(s). If the receiver has not set up a default account in 837, then the funds may be moved to a master settlement account 835 and the receiver may see the payment as an incoming payment within online banking 833. The receiver may then be able to move instantly the funds to any of their accounts.

Payment may be made by providing a mobile phone number. This operation may perform exactly as described above for Alias ID if there is a match in 839 on the mobile number. If there is no match in 839, then a text message may be sent to the mobile number provided. If the receiver of the message is an existing financial entity online banking customer, then that person may be allowed to sign into their online banking account 841, register the phone number, and then receive funds similar to the process described above for Alias ID. If the receiver is a financial entity customer who is not registered for online banking, then that customer may be able to register 851 for online banking and access funds following the same process as described above. If the receiver is not a financial entity customer with an account eligible for receiving funds, then they may be given the option to sign up 851 for a P2P/P2M account 843 at the financial entity that they can access through online banking or return funds to the sender 853.

After completion of registration 851, the receiver 849 may get access to the funds from this account. Subsequently the receiver may keep the funds in the account or add more funds from an external bank account 845 using the financial entity's existing ACH transfer capability and then use the funds to make P2P/P2M payments to others. They will also have the option to move the funds to their external bank account 845 anytime making use of the financial entity's existing ACH transfer capability.

Payment also may be made by providing an email address 821. This operation may perform exactly as described above for a mobile number 819 except that the message may be sent to the email address input by the sender. Payment may be made by providing a social networking ID 823. The financial entity may extend availability of this product to various social networking platforms. In that situation, the process operates in the same way as described above for mobile phone number 819 and email address 821 except the social networking platform may be used to notify the receiver based on the social networking ID 823 provided by the sender. In this situation, if the receiver is not a financial entity customer, then she may be given the option to sign up 851 for a P2P/P2M account 843 at the financial entity, which she may access through online banking to access the funds sent to them. The financial entity P2P/P2M account 843 may include a companion ATM/debit card 847.

In all cases described above, if the receiver is already a registered P2P/P2M customer at the financial entity, a text message and/or email may be sent to that customer irrespective of information entered by sender if there is one found in their profile.

Figure 9:
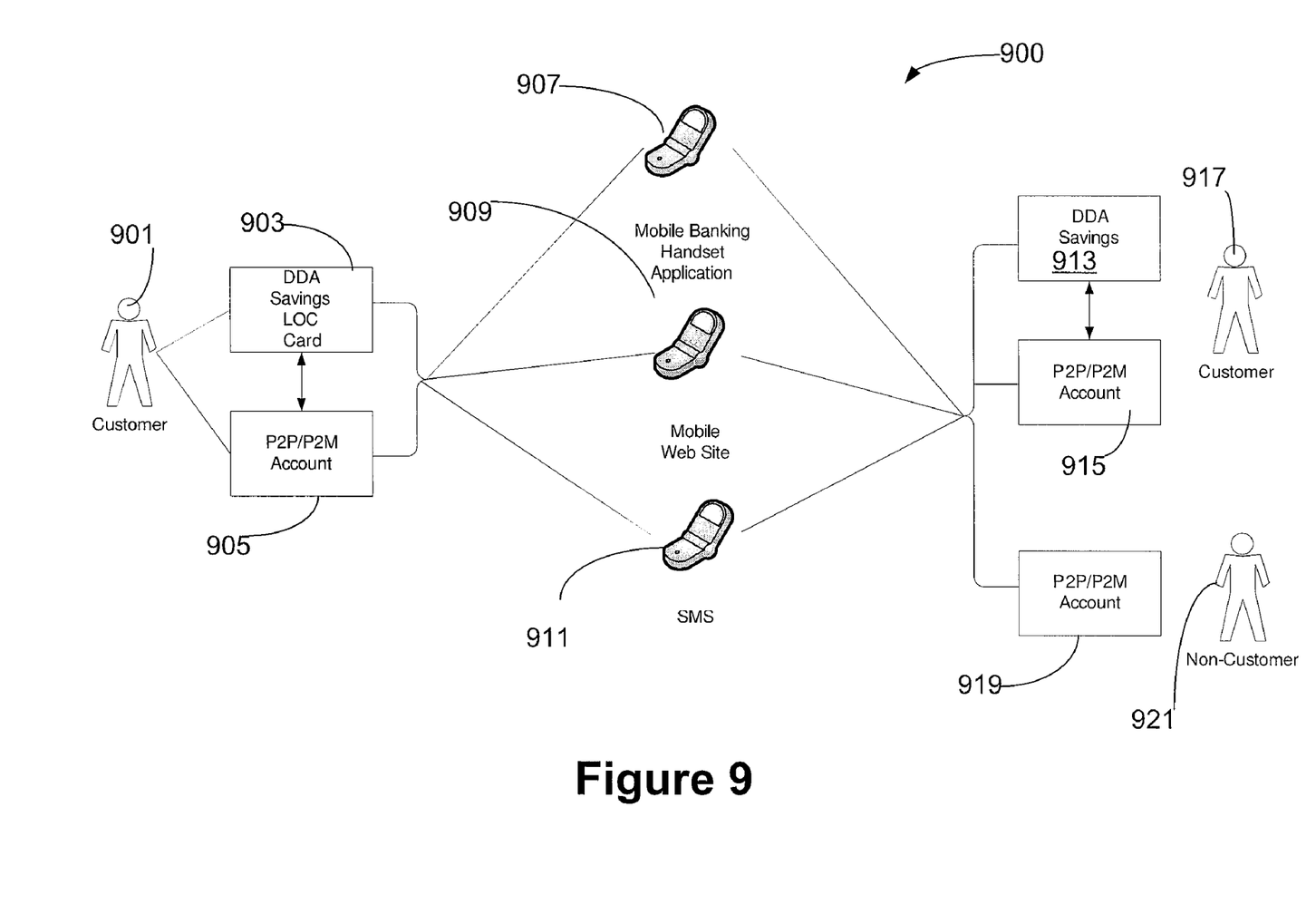
FIG. 9 is an example flowchart of a method for making payments from a mobile device in accordance with one or more aspects of the present invention.

FIG. 9 is an example flowchart of a method 900 for making payments from a mobile device in accordance with one or more aspects of the present invention. A customer 901 who is signed up for the service has the option to initiate payment from a DDA, savings, line of credit, and/or credit card of the financial entity 903 and/or from a P2P/P2M account 905 through the financial entity's mobile banking web site 909 or a mobile banking handset application 907 downloaded on the phone by providing any of the above information, e.g., phone number, email address, Alias ID, social networking ID. Customers also are able to initiate payments by sending a text message 911 to the financial entity that contains the receiver's phone number, email address, Alias ID, or social networking ID. Whether via a mobile banking handset application 907, mobile web site 909, or short message service 911, a receiver associated with the financial entity 917 may receive funds at her DDA, savings, etc. 913 and/or P2P/P2M account 915. A receiver not associated with the financial entity 921 may receive funds at her P2P/P2M account 919.

Figure 10:
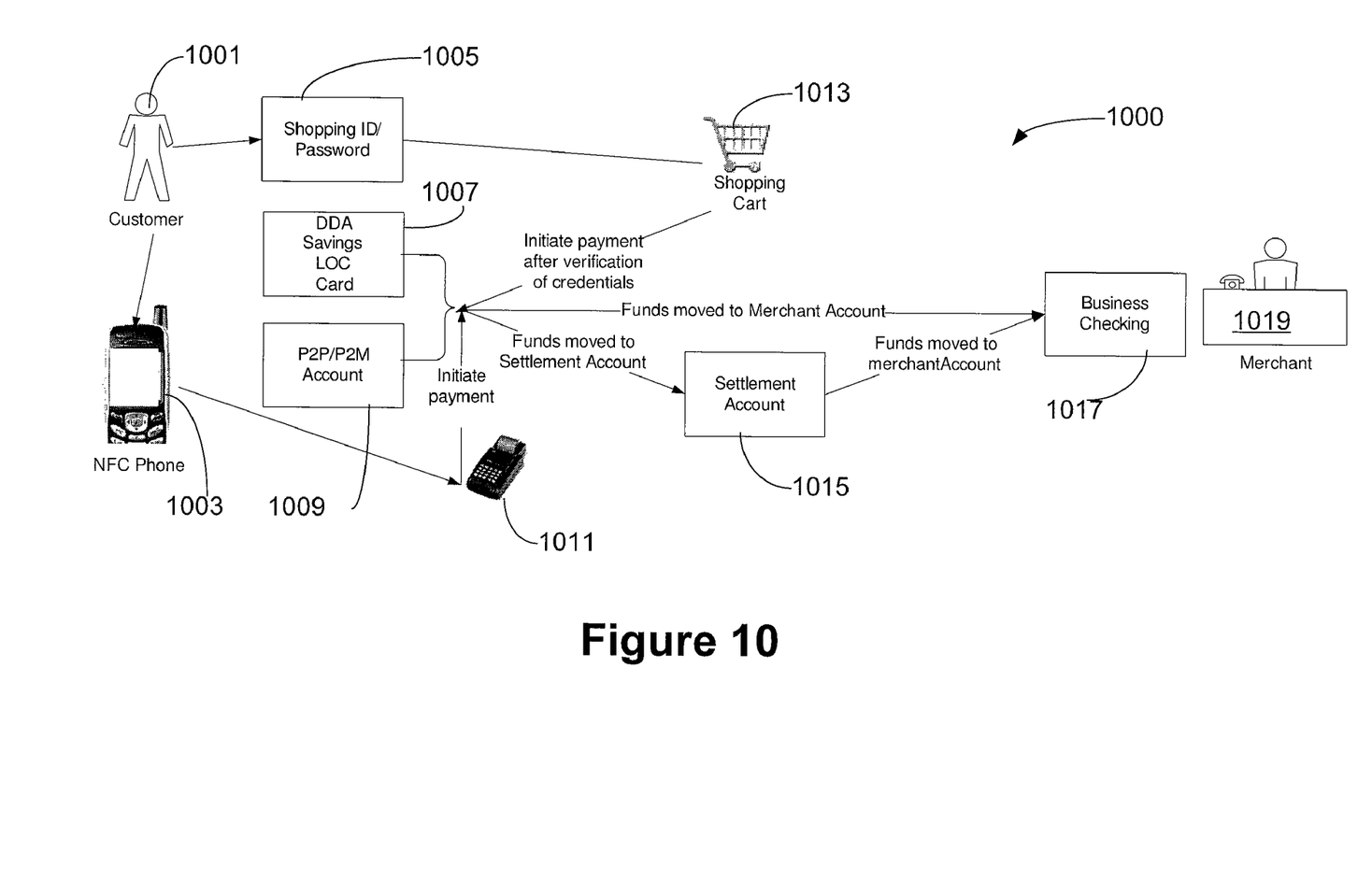
FIG. 10 is an example flowchart of a method for making payments to a merchant in accordance with one or more aspects of the present invention.

FIG. 10 is an example flowchart of a method 1000 for making payments to a merchant in accordance with one or more aspects of the present invention. For all customers 1001 who are signed up for the service, the financial entity lets them create a unique shopping ID and password 1005 linked to each of their accounts which may be used to make purchases at merchant 1019 web sites 1013. Such customers 1001 are able to input their shopping ID and shopping password 1005 on any merchant's 1019 web site 1013 who has signed up for the service. Upon successful validation of the credentials and if the customer 1001 has sufficient funds in their account, the money may instantly be transferred from the customer's account 1007 and/or 1009 to the merchant's checking account 1017. Alternatively, the financial entity may offer merchants 1019 the ability to consolidate such payments 1015 and receive one lump sum payment from the financial entity.

Customers will also have ability to link their bank accounts to any Near Field Communications (NFC) enabled phone 1003. In that situation, customers 1001 may initiate instant movement of funds 1011 from their financial entity account 1007 and/or 1009 to the merchant 1019 from their phone 1003. In accordance with some aspects, the customer may have a non-NFC enabled phone. In such a situation, a merchant 1019 may key in the customer's phone number in a cash register or other computing device. The customer then may be alerted about the payment amount on her phone. The customer may authenticate, such as by use of a personal identification number (PIN) or scanning of a fingerprint of the customer, to ensure that the phone has not been misappropriated and then authorize the payment. In accordance with other aspects, a customer who uses her companion card at a retailer, such as a branded coffee cafe, immediately may receive a receipt on her phone and, at the same time, may be prompted on her phone to make additional purchases, such as at a media store on the Internet or a discount offer on a certain product.

The customers may be given an option to open multiple P2P/P2M accounts 1009 and use those for different needs, e.g., one account may be used for P2P payments, one account may be used for general purchase, and another account may be used just for a specific merchant 1019. The customer 1001 is able to keep only as much money as she wants in these accounts and is given the option to set limits that help prevent misappropriation, e.g., maximum transaction amount, number of transactions in a day, etc.

These processes and systems lets customers of a financial entity send payments to anyone outside the financial entity, let non-financial entity customers open accounts with the financial entity through a viral account opening process, and provides customers the ability to make P2P/P2M payments from an account that may be instantly funded.

As should be understood by those skilled in the art, various combinations and subcombinations of the descriptions included herein may be utilized absent the illustrative example provided. For example, in accordance with one or more aspects of the present disclosure, there is no requirement in place to mandate a user to open a master account with a financial entity before a sub-account may be opened. A person using an account with a merchant that is linked to the financial entity is able to open a sub-account anytime without first having to apply for a master DDA with the financial entity. In such a situation, the sub-account is an account of the user in which the user does not have other accounts affiliated with the financial entity. As such, the merchant, such as a media downloading web site, may have a link to open such a sub-account with the financial entity. In addition, a person receiving payment who does not have a sub-account may open one to get access to those funds. A P2P/P2M account may be such an opened account is a P2P/P2M account described herein may exist on its own.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. An apparatus comprising:
at least one processor; and
at least one memory having stored thereon executable instructions that, when executed by the at least one processor, cause the apparatus to perform a method of:
  establishing a monetary account with an entity;
  identifying an account user associated with the monetary account;
  establishing a sub-account with the entity, the sub-account being associated with the monetary account and including monetary funds transferred from the monetary account;
  identifying at least one sub-account user associated with the sub-account, the at least one sub-account user being different from the account user; and
  establishing one or more controls, placed by the account user, on at least one of the sub-account and the at least one sub-account user,
  wherein the at least one sub-account user is restricted from accessing monetary funds in the monetary account and the account user is permitted to access the sub-account.

2. The apparatus of claim 1, the method further comprising:
receiving a request from the account user to transfer the monetary funds from the monetary account to the sub-account; and
transferring the monetary funds from the monetary account to the sub-account.

3. The apparatus of claim 1, wherein the one or more controls include an ability to transfer monetary funds out of the sub-account based upon at least one of an amount of monetary funds out of the sub-account, a particular recipient of the monetary funds out of the sub-account, and a time period for the transfer of monetary funds out of the sub-account.

4. The apparatus of claim 1, wherein the one or more controls include an ability to receive monetary funds into the sub-account based upon at least one of an amount of monetary funds into the sub-account, a particular provider of the monetary funds into the sub-account, and a time period for the receipt of monetary funds into the sub-account.

5. The apparatus of claim 1, wherein the at least one sub-account user includes at least two sub-account users, wherein a first control of the one or more controls is established on a first sub-account user of the at least two sub-account users and a second control of the one or more controls is established on a second sub-account user of the at least two sub-account users, the first and second sub-account users being different and the first and second controls being different, wherein the second control is not established on the first sub-account user.

6. The apparatus of claim 1, the method further comprising:
establishing a partner account, with the entity, for at least one partner entity of the entity;
receiving a request from the at least one sub-account user to transfer a portion of monetary funds from the sub-account to the at least one partner of the entity; and
transferring the portion of monetary funds from the sub-account to the partner account, wherein the portion of monetary funds remain within the entity throughout the transfer.

7. The apparatus of claim 1, the method further comprising:
creating at least one dependent payment instrument associated with the sub-account;
permitting the at least one sub-account user to transfer monetary funds out of the sub-account using the at least one dependent payment instrument,
wherein the dependent payment instrument does not permit access to the monetary account.

8. An apparatus comprising: at least one processor; and at least one memory having stored thereon executable instruction that, when executed by the at least one processor, cause the apparatus to perform a method of: establishing a monetary account with an entity, the monetary account including monetary funds maintained within the entity; identifying an account user associated with the monetary account; establishing a partner account, with the entity, associated with a partner entity of the entity, the partner account including monetary funds maintained within the entity; receiving a request from the account user to transfer monetary funds from the monetary account to the partner account through a website associated with the partner entity; transferring the monetary funds from the monetary account to the partner account, wherein the monetary funds remain within the entity throughout the transfer; receiving a plurality of requests from a plurality of account users to transfer monetary funds from monetary accounts associated with the plurality of account users; and transferring the monetary funds from the monetary accounts associated with the plurality of account users to a settlement account of consolidated monetary funds, wherein the transferring the monetary funds from the monetary account to the partner account includes transferring the consolidated monetary funds in the settlement account to the partner account as a single transfer.

9. One or more computer readable media storing computer executable instructions that, when executed by at least one processor, cause the at least one processor to perform a method comprising:
establishing a monetary account with an entity;
identifying an account user associated with the monetary account;
establishing a sub-account with the entity, the sub-account being associated with the monetary account and including monetary funds transferred from the monetary account;
identifying at least one sub-account user associated with the sub-account, the at least one sub-account user being different from the account user; and
establishing one or more controls, placed by the account user, on at least one of the sub-account and the at least one sub-account user,
wherein the at least one sub-account user is restricted from accessing monetary funds in the monetary account and the account user is permitted to access the sub-account.

10. The one or more computer readable media of claim 9, the method further comprising:
receiving a request from the account user to transfer the monetary funds from the monetary account to the sub-account; and
transferring the monetary funds from the monetary account to the sub-account.

11. The one or more computer readable media of claim 9, wherein the one or more controls include an ability to transfer monetary funds out of the sub-account based upon at least one of an amount of monetary funds out of the sub-account, a particular recipient of the monetary funds out of the sub-account, and a time period for the transfer of monetary funds out of the sub-account.

12. The one or more computer readable media of claim 9, wherein the one or more controls include an ability to receive monetary funds into the sub-account based upon at least one of an amount of monetary funds into the sub-account, a particular provider of the monetary funds into the sub-account, and a time period for the receipt of monetary funds into the sub-account.

13. The one or more computer readable media of claim 9, wherein the at least one sub-account user includes at least two sub-account users, wherein a first control of the one or more controls is established on a first sub-account user of the at least two sub-account users and a second control of the one or more controls is established on a second sub-account user of the at least two sub-account users, the first and second sub-account users being different and the first and second controls being different, wherein the second control is not established on the first sub-account user.

14. The one or more computer readable media of claim 9, the method further comprising:
establishing a partner account, with the entity, for at least one partner entity of the entity;
receiving a request from the at least one sub-account user to transfer a portion of monetary funds from the sub-account to the at least one partner of the entity; and
transferring the portion of monetary funds from the sub-account to the partner account, wherein the portion of monetary funds remain within the entity throughout the transfer.

15. The one or more computer readable media of claim 9, the method further comprising:
creating at least one dependent payment instrument associated with the sub-account;
permitting the at least one sub-account user to transfer monetary funds out of the sub-account using the at least one dependent payment instrument,
wherein the dependent payment instrument does not permit access to the monetary account.

16. One or more computer readable media storing computer executable instructions that, when executed by at least one processor, cause the at least one processor to perform a method comprising: establishing a monetary account with an entity, the monetary account including monetary funds maintained within the entity; identifying an account user associated with the monetary account; establishing a partner account, with the entity, associated with a partner entity of the entity, the partner account including monetary funds maintained within the entity; receiving a request from the account user to transfer monetary funds from the monetary account to the partner account through a website associated with the partner entity; transferring the monetary funds from the monetary account to the partner account, wherein the monetary funds remain within the entity throughout the transfer; receiving a plurality of requests from a plurality of account users to transfer monetary funds from monetary accounts associated with the plurality of account users; and transferring the monetary funds from the monetary accounts associated with the plurality of account users to a settlement account of consolidated monetary funds, wherein the transferring the monetary funds from the monetary account to the partner account includes transferring the consolidated monetary funds in the settlement account to the partner account as a single transfer.

* * * * *